Oct. 17, 1944. C. LURTZ 2,360,613
ESCAPEMENT MECHANISM SUITABLE FOR TIMING DEVICES
Filed March 25, 1936 2 Sheets-Sheet 1

INVENTOR.
BY Edward Thomas
ATTORNEY

Oct. 17, 1944.  C. LURTZ  2,360,613
ESCAPEMENT MECHANISM SUITABLE FOR TIMING DEVICES
Filed March 25, 1936  2 Sheets-Sheet 2

INVENTOR.
BY
Edward Thorney
ATTORNEY

Patented Oct. 17, 1944

2,360,613

UNITED STATES PATENT OFFICE 2,360,613

ESCAPEMENT MECHANISM SUITABLE FOR TIMING DEVICES

Carl Lurtz, Brooklyn, N. Y.

Application March 25, 1936, Serial No. 70,773

22 Claims. (Cl. 58—117)

This invention relates to escapement mechanisms suitable for timing devices, and is herein illustrated as embodied in an easily built, rugged, fool-proof escapement.

Many escapement mechanisms have been devised, most of the balance wheel type which include springs of the kind known as hair springs. These springs involving expensive manufacturing processes, introduce a very sensitive element into the escapement, and, usually, escapements embodying them are not self-starting from a position of rest. The springs commonly used are delicate elements to assemble with the rigid parts, and require expert individual adjustment after assembly, in addition the hairspring has to be individually adjusted, because no two springs can be counted on as being identical in resiliency and shape.

In many escapements, such as the commonly used anchor type, the impelling faces engage the parts they drive at points distant from the line joining the centers on which the parts turn, with the result that impulsion to the pallet is given, more or less, by a lifting force of the escape wheel, in consequence the teeth of the escape wheel slide over a relatively long part of the impulse face, thus causing excessive friction.

In the present invention no springs are needed, and all the essential parts may be stamped, thus assuring substantial identity of operation of every escapement built on a given design. In addition, the new invention provides an escapement wheel which need not drive or control parts by extreme ends of its teeth, but drives or controls by their flat, or nearly flat, faces. As a result the teeth resist wear for a long time, and any wearing down of the teeth is relatively unimportant. Moreover, the escapement may be self-starting, thus adapting it for many timing devices where fool-proof operation is essential.

The escapement parts may be so designed that their assembling may be done with inexperienced labor, and may even be effected by automatic machines if desired, provided the individual parts are designed to that end.

The device is capable of being built with adjustable parts so that the speed of the escapement may be readily altered if desirable.

The shaft of the balance wheel lies close to the path of the teeth of the escapement wheel enabling the impulse elements which drive the balance wheel to be close to its shaft and thus a small travel of those elements turns the balance wheel through a large arc, and making it possible for a relatively light balance wheel to control the escapement wheel. But the impulse faces on the intermediary lever are relatively far removed from the shaft on which that lever turns, making it possible for the escapement wheel and lever to have large radii compared to the radii on which the said impulse elements turn. This ratio of radii gives room for a large and round balance wheel, swinging in a plane parallel to the other members, which is very desirable in smaller mechanisms and permits economical construction.

In addition to these advantages the long radius of the intermediary lever makes it possible for the pallet of the balance wheel to carry back the lever with little sliding friction.

The present invention further enables different forms of escapement devices to be constructed with embodiment of an escapement wheel having a minimum number of two teeth or driving members, or any practical number of operating members above two, provided the other two interacting members of the escapement mechanism are suitably formed and arranged so that the escapement wheel with a given number of operating members may properly interact with the other component parts of the device.

In the forms shown each impelling face drives its corresponding impelled face across the line joining the centers on which the respective faces turn, thus eliminating all lifting motion and making it possible to design impelling faces which produce rolling contact action.

As a result of the new arrangement of parts, it is possible to reverse the motion of the escape wheel and drive the mechanism by the pallet or by the intermediary lever with relatively high efficiency.

Moreover, when the escapement wheel is the driving element, the pallet shaft is well adapted to carry a bell-striking arm.

Instead of extremely pointed teeth on the escape wheel acting on the pallet, and instead of a lifting and sliding action on the impulse faces causing detrimental friction, the device is capable of so being built that the impulse faces of all parts may be nearly or exactly involute or epicycloidal tooth faces, thus enabling wear and friction to be almost eliminated. In one form of the invention, capable of being built with stamped parts, and then fitted together with the respective shafts and having the pallet made fast by upset edges, it is possible to so design the parts that all impulse planes are disposed on external faces, and are therefore easily polished after being formed by stamping or milling.

Other features and advantages will hereinafter appear.

In the accompanying drawings.

Figure 1:
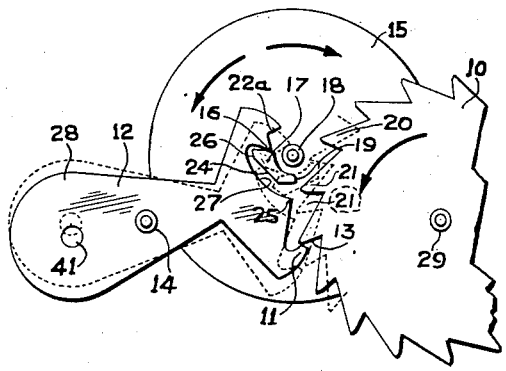
Figure 1 is a plan view of one form of escapement.

In the form shown in Figure 1 of the accompanying drawings an escapement wheel 10, turning in the direction of the arrow is impelling a tooth 11 on an intermediary lever 12 by its tooth flank 13, causing the lever 12 to swing on its pivot 14 from its full line position to its dotted line position. This causes the lever 12 to impel the balance wheel 15 counterclockwise, because a second tooth 16 on the lever 12 strikes a pallet 17 fast on the balance wheel 15, near its shaft 18 and axially above the flat face of the balance wheel.

This impelling of the balance wheel 15 carries the impulse face 19 of the pallet 17 into the path of another tooth 20 of the escapement wheel 10, ready to arrest the momentum of the wheel.

To enable the impulse face 19 to clear the tooth 21 of the escapement wheel which is in advance of the tooth 20, the body of the face 19 is cut away at 22.

When the advancing tooth 20 strikes the impulse face 19 it impels the balance wheel 15 in the opposite or clockwise direction, causing the pallet 17 to drive the tooth 16 before it.

The tooth 16, being part of the lever 12, swings the lever 12 counterclockwise carrying the tooth 11 into the path of the tooth 21 of the escapement wheel 10, that is, the tooth which has passed the impulse face 19 of pallet 17.

Figure 2:
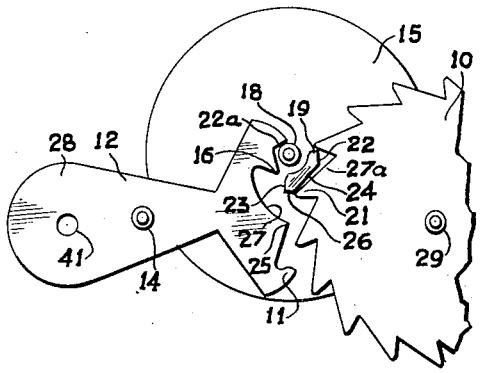
Figure 2 is a similar view showing parts arrested to prevent overthrow.

To limit the throw of the lever 12, a stop 22ª projects radially of the lever beyond the tooth 16, so that, as shown in Figure 2, at the limit of the proper throw of the lever 12, the stop 22ª strikes the shaft 18 of the balance wheel.

By virtue of other constructional features of the pallet 17, the latter serves to prevent overthrow of the balance wheel 15 in either direction of its vibration. To accomplish this end, the section 24 of the pallet 17, being made of substantial length, has a portion adapted to strike the rear edge 27ª (Fig. 2) of the tooth of the escapement wheel 10 at the limit of throw of the balance wheel in a counter-clockwise direction; while at the limit of throw of the balance wheel in a contrary direction, the back section 24 of the pallet 17 abuts the edge-section 27 lying between the tooth 16 and the lug 25 of the lever 12. Another lug 26 on the pallet 17 is adapted to intercept the lug 25 of the lever 12 when the escapement parts are disposed in the relative position as shown in Fig. 2, this last described lug is a safeguard to prevent the lever 12 to swing with its lug 25 past the pallet 17 by some force acting on the lever 12 while the escapement parts are in the position disclosed in Fig. 2. Thus, as above related, a motion-inhibiting instrumentality is embodied in the three principal interacting members of the escapement mechanism, namely, the escapement wheel, the pallet and the intermediary lever, so that the lever and the pallet can under no circumstances be moved to such a position as to cause the device to become inoperative.

The end 28 of the lever 12 shown to the left of the pivot 14 and opposite the teeth 16 and 11, is shown of a weight exactly equal to the weight of the parts to the right of the pivot 14, as is preferable.

In the form shown, the tooth 16 begins to push the pallet 17 before it reaches the line joining the centers 14 and 18, and the tooth 20 begins to push the pallet before it reaches the line joining the center 18 and the escapement wheel pivot 29, but the tooth 16 moves more before it reaches its line of centers, than the tooth 20 moves in pushing before it reaches its line of centers. To offset the resulting greater pressure required for the shorter path the tooth 11 is set further from its pivot 14 than is the tooth 16. The above-mentioned difference in path is such that the balance wheel is impelled over equal arcs in vibrating in each direction.

In the form shown, with a seventeen-tooth escapement wheel and with the spacing of shafts 18 and 29 shown each arc is 58°, or thereabouts.

The throw of the escapement wheel of the device shown varies between about 10° and 20° in excess of the arc over which it is being impelled, the arc largely depending on the power driving the escapement wheel.

Figure 7:
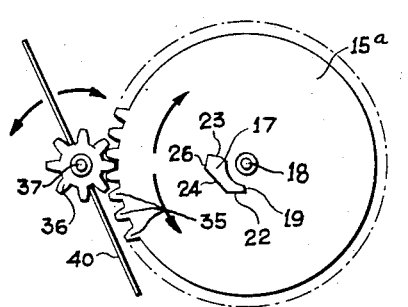
Figure 7 is a fragmentary plan view of a modification.
Figure 8:
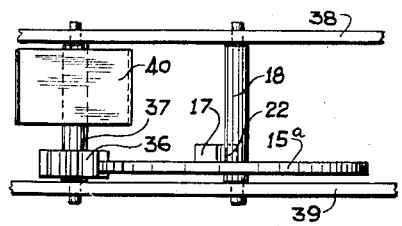
Figure 8 is a side view of Figure 7.

In Figure 7 is shown a modification including a vane for slowing down the action of the escapement, and, incidentally, minimizing any change of speed due to change in driving force.

In this form the wheel 15ª is provided with peripheral teeth 35 adapted to rapidly drive an air-engaging vane which brakes the speed in each direction.

In the form shown the teeth 35 drive a small pinion 36 fast on a shaft 37 which is journalled in the bottom and top plates 38 and 39 in which the gear wheel 15ª rotates and on the shaft 37 is a broad vane 40 centrally secured to said shaft.

Figure 3:
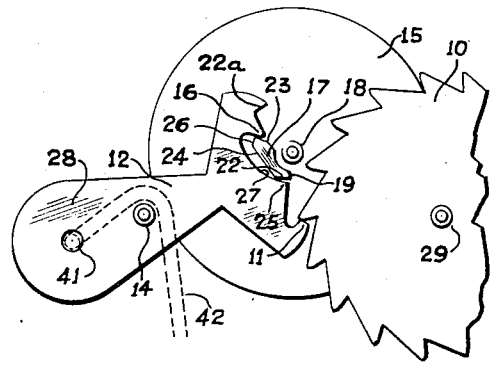
Figure 3 is a similar view showing parts at the other limit of throw.

The escapement is adapted to be incorporated into a pendulum clock as shown in dotted lines in Figure 3, in which the usual pendulum fork 42 is shown with its upper end bent around the pivot 14 and carried through an opening 41 in the broad end 28 of the intermediary lever 12 to swing with the lever. By suitably proportioning the distance between the pivots 14 and 18, the escapement may be included in a clock having a pendulum with any swing. In this construction the weight of the balance wheel may be replaced by the pendulum weight.

Figure 4:
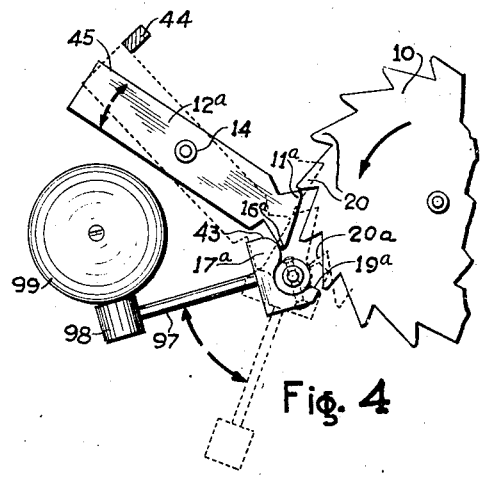
Figure 4 shows an alternative form of escapement.

In Figure 4 is shown a modified form of the invention which is well adapted for economical production because the intermediary lever 12ª requires considerably less material than the other forms shown and the teeth 11ª and 16ª on said intermediary lever have contact faces which face outwardly and are, therefore, easily polished. Usually the said contact faces are of involute or epicycloidal shape to play against substantially involute or epicycloidal faces on the teeth 20 of the escapement wheel 10, and on the opposing face 43 of the pallet 17a.

The impulse face 19a of the pallet 17a which is thrust into the path of an oncoming tooth 20a and the impulse face 43 of the pallet 17a, which receives the impulse of the face 16a of the intermediary lever 12a, are also curves with an involute or epicycloidal face which face outwardly and may be easily polished.

The device is easily susceptible of machine assembly and needs no alining or adjustment, once properly designed.

To limit the throw of the intermediary lever 12a against possible overthrow when the pallet has swung to its extreme counterclockwise position, there is provided a stop 44, shown as engaging the outer end 45 of the lever 12a.

To obtain the foregoing advantages the device of Figure 4 is shown with a tooth 20 of the escapement wheel 10 held impelling the face 11a of the lever 12a. The impulse swings the lever 12a around its pivot 14, causing its outer impelling face 16a to impel the pallet 17a by its outer impelling face 43, thus swinging the pallet, and the balance wheel of which it is a part, to carry its outer impelling face 19a in the path of the next tooth 20 to arrest the wheel. Then that tooth 20 drives the balance and its pallet back, causing the impelling face 43 to swing the lever 12a so that its impulse face 11a again arrests the escapement wheel 10.

It will be noted that the pallet 17a is shown spaced from the reduced section of the shaft for the balance or hammer-arm, thus, if a disk is employed for the support of the pallet 17a, a separate opening may be made into the said disk, at a small distance from the center hole for the shaft, so that the pallet 17a may be secured in said separate opening, instead of securing the pallet 17a to its shaft by means of a pin or similar device, as shown in Fig. 4.

Figure 5:
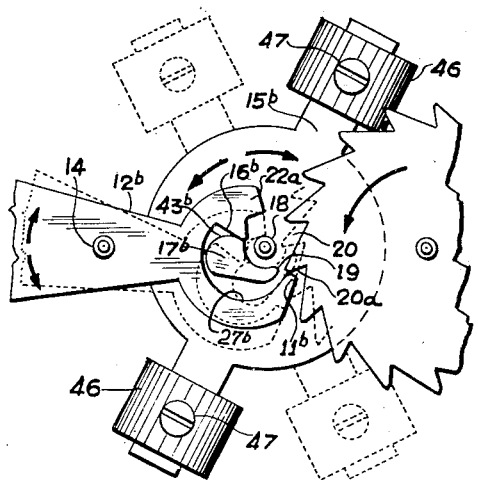
Figure 5 shows a third form.

In the modified structure shown in Figure 5 the oncoming tooth 20 first strikes the impelling face 19 of the pallet 17b, and drives the pallet 17b and the balance wheel 15b, of which it is a part, just as in Figure 4, so as to cause the impulse face 43b of the pallet 17b to swing and drive the impulse face 16b of the intermediary lever 12b around its shaft 14. This carries the other impelling face 11b of the lever into the path of the tooth 20a just released from the pallet face 19, and thus arrests that tooth again.

It will be noted that all the impulse faces shown in this figure are easily formed to roll involutely or epicycloidally, and that there is only one internal face 16b. Moreover, normally no stop is needed, but the end 22a of the lever 12b may serve as a stop by striking the hub or shaft 18. In this figure the effective weight of the balance wheel is shown as adjustable by movable or replaceable weights 46, shown diagrammatically as settable by screws 47.

In the device of Fig. 5, the pallet 17b is provided with an enlarged body-portion at its left-hand side having a circular edge which is continuous with the impulse face 43b of the pallet 17b; this circular edge, or an edge of some other suitable form, serves a special function when the pallet 17b is disposed in the position as shown in dotted lines in the drawings, in which position the tooth 11b of the lever 12b is out of engagement with the tooth 20a of the escapement wheel. Now, in order to prevent the tooth 11b from moving back into the path of the tooth 20a at the time when recoil motion is effected therein when the pallet 17b, while swinging in a counterclockwise direction, engages the tooth 20 of the escapement wheel, there is a curviform edge 27b provided on the lever 12b; said curviform edge is disposed intermediate of the lever teeth 16b and 11b, so that the lever 12b may be intercepted by the pallet 17b if for any reason a tendency is produced in the said lever to urge it in a counterclockwise direction before the above mentioned recoil motion in the escapement wheel takes place. This last described constructional feature provides a simple and effective means to prevent the tooth 20a, during its recoil motion, from coming into contact with the tooth 11b of the intermediary lever 12b. A similar object may be achieved with aid of some modified form of device; for instance, a projecting pin may be secured to the balance wheel 15b in such a position that the said pin is carried at the proper time during operation of the device over a small portion of the outer circular edge of the lever 12b, that is, the edge which is disposed above the stop-member 22a of the said lever.

Figure 6:
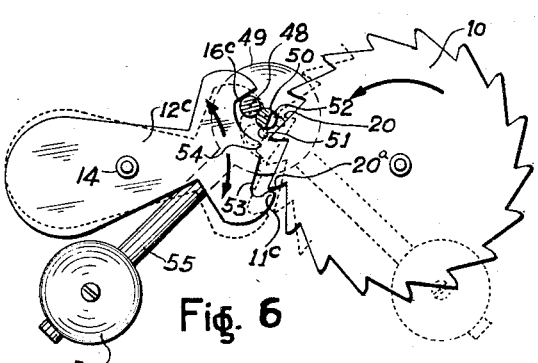
Figure 6 shows a fourth form.

In Figure 6 is shown an alternative form of the invention especially adapted to control a string impulse or drive. The escapement wheel 10 is shown with a tooth 20 in driving engagement with the tooth 11c of an intermediary lever 12c, so that it will swing the lever around its shaft 14 and cause a second impelling face 16c on the lever 12c to carry down a pin 48, which is fast on a plate 49 fixed to a shaft 50, so as to turn the shaft and carry a second pin 51 fast on the plate 49 to its dotted line position where it momentarily stops a prior tooth 20a and is then impelled by this tooth downwardly. This downward impelling causes the pin 48 to swing back the lever 12c and carry the tooth 11c into the path of the next on-coming tooth 20a to arrest it.

To facilitate the close setting of the shaft 50 to the escapement wheel 10, it is shown as cut away at 52, and the internal face 53 of the lever 12c is cut away at 54 to accommodate and impel the second pin 51 in case overthrow of parts permits the lever 12c to swing out of its normal throw.

This escapement is shown as controlled by a wide throw pendulum 55 fast to the shaft 50 and having an adjustable bob 56.

Figure 9:
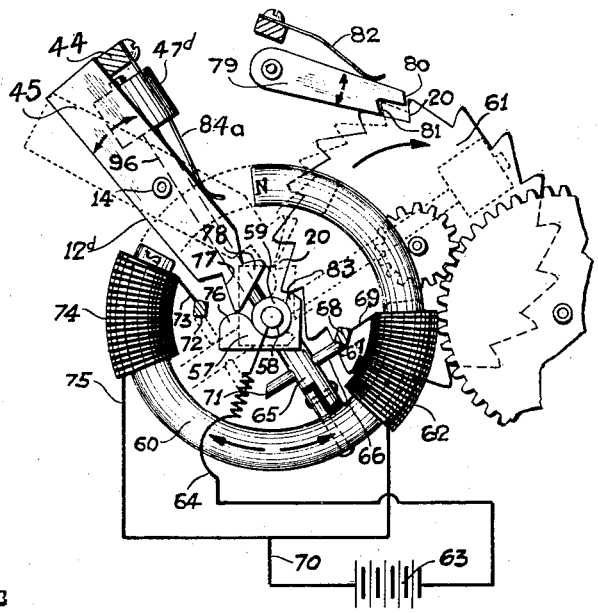
Figure 9 is a fragmentary view showing how the escapement may drive a gear train.

Figure 9 shows diagrammatically a power driven pallet 57 fast to a shaft 58, with a clearance 59 between them, said shaft also carrying a polarized iron core 60 which is adapted to rotate the pallet shaft 58 back and forth to drive the toothed wheel 61, corresponding in a way to the escapement wheel 10 of Figure 4.

The pallet 57 shown is substantially identical with the pallet 17a of Figure 4. In the form and position shown the core 60 is about to be pulled by the coil 62 because the coil is excited by a current coming from a battery 63 connected by a conductor 64 to the shaft 58, flowing from the shaft through an arm 65 and a contact piece 66 fast on the arm. The contact piece 66 is shown with its terminal 67 against a terminal 68, so that the current flows through a flexible conductor 69 to the coil 62, through the coil and out through a conductor 70 to the opposite pole of the battery 63.

The coil 62 thus excited is shown as so built that it pulls the north pole of the core 60, rotating the shaft 58 on which it is mounted and thus rotating the pallet 57.

The rotating shaft and pallet are carried around until a second terminal 71 on the contact piece 66 strikes a terminal 72 electrically connected by a flexible conductor 73 to a second coil 74 so wound that when excited it pulls the south pole of the magnet 60. The striking of the terminal 71 against the terminal 72 closes the circuit from the shaft 58 through the coil 74 and a conductor 75 electrically connected to the conductor 70.

In swinging the pallet 57 from the position shown its impulse face 76 strikes the face 77 of the intermediary lever 12$^d$, swinging the lever on its shaft 14 so that the opposite face 78 strikes a tooth 20 of the wheel 61, driving the wheel a half tooth-space.

The wheel 61 is caught in this position by a pawl 79 shown as having two tooth-arresting faces 80, 81, so as to catch the teeth 20 of the wheel 61 at every half tooth step, under the pressure of its spring 82.

When the terminals 71 and 72 comes into contact and closes the circuit through the coil 74, the core 60 is drawn in by the coil 74, turning the pallet counter-clockwise, causing its impulse face 83 to push the adjacent tooth 20, advancing the wheel another half tooth space, and carrying the terminal 67 back to its first position.

The lever 12$^d$ follows the pallet in this motion under the pressure of its spring 84$^a$.

To balance the core 60 and other weights embodied therewith around the shaft 58, there is shown in Fig. 9 an arm 96, fast on the shaft 58, provided with an adjustable weight 47$^d$ adapted for adjustment.

Normally, when the device is at rest, the spring conductor 69 is held flexed because of the pushing force exerted on the terminal 68 by the contact member 66 to which power is transmitted in an angular direction from the spring 84$^a$ of the lever 12$^d$. At the moment electricity is made available for the operation of the device, the electric contact between the terminal 68 and the terminal 67 is not broken instantly when the iron core 60 starts moving in a clockwise direction, because the spring conductor 69, by its reflex action, compels the terminal piece 68 to remain in contact with the terminal 67 over a short angular distance; hence, the electro-magnetic power generated in the coil 62 remains effective for a definite length of time, long enough to enable the iron core 60 to gather sufficient speed so as to cause it, with aid of its stored force of momentum, subsequently to severance of the electric contact between the terminals 67 and 68, to be swung around in a clockwise direction until the terminal member 71 strikes the terminal piece 72 which is likewise connected to a flexible conductor arm 73, adapted to yield in an angular direction to a limited degree, thus preventing the motion of the iron core 60 to be arrested instantaneously at the moment the terminal 71 strikes the terminal 72. The electric contact between the two last mentioned terminal pieces is therefore maintained for a duration of time sufficiently long to enable the motion of the iron core 60 to be reversed by force of the accumulated electro-magnetic power generated in the coil 74, and also with aid of the retroactive force of the spring conductor 73 and the lever-spring 84$^a$, so that upon interruption of the electric circuit at this end, the iron core 60, having attained a definite angular speed, is enabled to continue its excursion until the terminal member 67 moves into engagement with the terminal piece 68 of the flexible conductor arm 69, whereupon the impulse action of the device is repeated as hereinbefore described.

Figure 10:
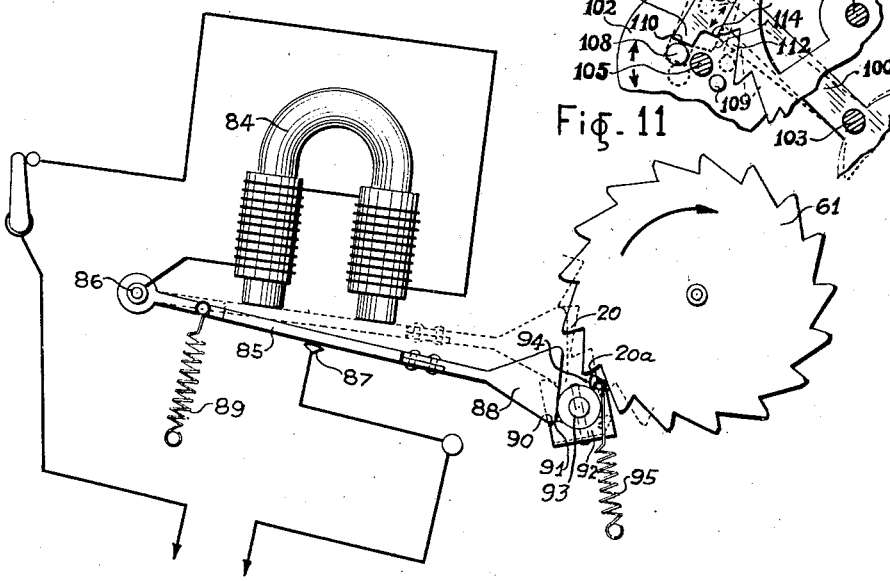
Figure 10 shows a modification of Figure 9.

The modified form, shown in Figure 10, may be regarded as applying power to the intermediary lever. In this form a source of power such as a magnet 84 pulls on an armature 85, shown as a lever pivoted at 86, so that when the magnet is energized by a current coming through the contact 87 it pulls a driving head 88 upward against a tooth 20 of the toothed wheel 61, turning the wheel a half tooth space.

When the contact 87 is broken the spring 89 forces the head 88 downward so that its driving face 90 impels the face 91 of the pallet 92, turning the pallet and its shaft 93 so that the impulse face 94 of the pallet drives its adjacent tooth 20$^a$ to turn the wheel 61 another half step. Unless there is a backward torque on the wheel 61 no pawl is needed.

The pallet 92 is drawn back by a spring 95, diagrammatically shown, so as to withdraw it when the head 88 is pulled by the magnet 84.

The member which supports the terminal piece 87 is made of spring-metal capable of being flexed to a limited extent by the pulling power of the spring 89, thus enabling the electric circuit to remain established for a sufficiently long period of time to afford the cumulative pulling power of the magnet 84 to draw the armature 85 up and away a short distance from the terminal piece 87. Motion over the short distance last mentioned is accomplished by virtue of the impetus the armature 85 receives from its speed and mass.

The device of the present invention is well adapted to operate a bell striking mechanism, diagrammatically shown in Figure 4, in which an arm 97 fast to the pallet shaft may carry a hammer 98 to strike a bell 99 intermittently. In this form the balance wheel 15 is not needed. If preferred the bell may be struck by a hammer on the intermediary lever 12$^a$.

Figure 11:
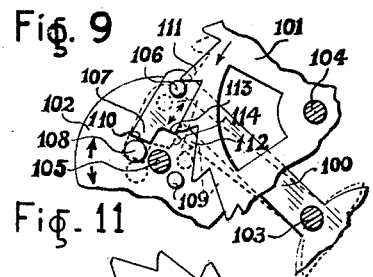
Figure 11 is another form of the escapement.

In the form shown in Fig. 11, the numeral 100 represents the intermediary lever, 101 the escapement wheel and 102 the balance wheel or disk; these three members are shown as mounted on their respective shafts 103, 104 and 105. The pin 106 fast on the intermediary lever 100, corresponds in a way with the tooth 11 of the intermediary lever shown and described in the first three forms of the invention, and the tooth 107 corresponds with the teeth 16 of the lever 12 of those first forms mentioned. Two pins, 108 and 109, fast on the balance wheel, and projecting above its plane, provide the pallet impulse faces, one engaging with the teeth of the escape wheel 101 and the other with the impulse face 110 of the tooth 107.

When the tooth 111 of the escape wheel, viewed in the full-line position, moves the pin 106 downward it transmits an impulse to the pin 108, causing the disk 102 to swing in a counterclockwise direction while impelling the pin 108 from the solid-line to the dotted-line position; in consequence the other pin or pallet 109 is moved into engagement with the on-coming escape wheel tooth 112 which arrests the motion of the escapement momentarily, then this tooth 112 impels the pin 109 in the reverse or counterclockwise direction, which action causes the lever 100 to be carried back to the full-line position by the pin 108, and now the pin 106 arrests the escapement wheel momentarily, subsequently receiving an impulse from this engaging tooth, repeating the action as formerly described.

To limit the throw of the lever 100 there is a face 113 provided to strike the balance wheel shaft after the impelling escape wheel tooth is released from the pin 106. Disengagement with the intermediary lever, when moving in a clockwise direction, is prevented by the relatively large pallet-pin 108 and the pin 106 which, when reaching the full limit of its motion, abuts against the base of the escapement wheel tooth, made possible by the relative arcs over which the escape wheel teeth and the lever move. In a counter-clockwise direction overthrow of the balance wheel is prevented by a step 114 provided on the lever 100 and struck by the pin 109 when moved to the full limit. A third pin, not shown in the drawings, may be added to accomplish the aforementioned purpose and this third pin may be positioned appropriately between the pins 108 and 109 so as to strike the back of the escapement wheel tooth thus limiting the overthrow of the balance wheel in the same manner as with the pallet described in other forms of the escapement herein.

It will be noted that the intermediary lever 100 is pivotally mounted on that side of the balance wheel which carries the pin 109 with which the escape wheel teeth engage. For this reason it makes it necessary to extend the tooth 107 with its impulse face 110 to the opposite side of the pallet 109 in order to effect reciprocal motion of the balance wheel. The shaft 103 of the intermediary lever may be mounted without the periphery of the escapement wheel if desired.

In analyzing this last described form of escapement it will be found that in substance it corresponds in every respect with the other forms in this specification described, differing only, to some extent, in the juxtaposition of parts composing the device, and in the relative motion of the intermediary lever with that of the balance wheel.

Having thus described certain embodiments of the invention, what is claimed is:

1. A speed-regulating device, comprising an escape-wheel, a first oscillatory body having, located relatively near its axis of oscillation, two impulse faces disposed in angular relationship with respect to each other; and a second oscillatory body having, located relatively far from its axis of oscillation as compared to the stated location of the first oscillatory body, two impulse faces disposed in angular relationship with respect to each other; one impulse face on the first oscillatory body being adapted to operatively engage one impulse face on the second oscillatory body for preservation of time-coextensive driving connection between the first and second oscillatory body; and the other respective impulse faces on the said oscillatory bodies being adapted, each impulse face in turn, to come into driving engagement with the escape-wheel while the device is under the influence of driving-power for effecting reciprocal motion in the first and second oscillatory body and rotative motion in the escape-wheel.

2. An escapement mechanism, comprising a weighted oscillatory member, a pallet therefor having a first and second impulse-face, both impulse-faces of the pallet being disposed relatively near the fulcrum of the weighted oscillatory member, an escapement wheel, and an intermediary lever having a first and second impulse-face, both impulse-faces of the lever being disposed at a distance from the axis of swing of the lever approximately equal as compared to the distance measured from the axis of rotation of the escapement wheel to the peripheral section thereof; the first impulse-face of the lever engaging the first impulse-face of the pallet for establishing a continuously operative driving couple between the lever and the pallet causing the second impulse-faces of the lever and pallet, respectively, to be urged alternately in and out of driving engagement with the escapement wheel during operation of the escapement mechanism.

3. An escapement mechanism, comprising an escape-wheel, a balance, a pallet therefor having a first and second impulse-face disposed relatively near the fulcrum of the balance, the second impulse-face of the pallet being adapted to receive impulsion successively from said escapement wheel, and an intermediary member having a first and second impulse face disposed farther from the fulcrum of the intermediary member as compared to the distance of the impulse-faces of the pallet from the fulcrum of the balance; the second impulse-face of the intermediary member being adapted to receive impulsion successively from the escapement wheel at periods when the second impulse-face of the pallet is out of driving engagement with the escapement wheel, and the first impulse-face of the intermediary member engaging the first impulse-face of the pallet for maintaining a link of driving power between the pallet and the intermediary member during periods when either one of them is impelled directly by the escapement wheel.

4. An escapement device including an oscillatory balance-wheel, a pallet on said wheel, an escapement wheel having teeth adapted to engage one side of the pallet periodically, an oscillatory member having a lever adapted for the establishment of a driving couple with the opposite side of the pallet during its oscillatory motion over definite angular degrees, an arresting tooth on the oscillatory member adapted to swing clear of the path of the teeth of the escapement wheel but to swing into the path of the last mentioned teeth when the pallet is driven by a tooth of the escapement wheel, and a motion-inhibiting instrumentality adapted to restrict the oscillatory motion of the pallet to an angle of definite maximum degree to enable the operativeness of the escapement device to be maintained in any angular position relative to the earth.

5. An escapement device including an oscillatory balance wheel, a pallet on said wheel, an escapement wheel having teeth adapted to engage one side of the pallet periodically, an oscillatory member having a lever adapted for the establishment of a driving couple with the opposite face of the pallet during oscillatory motion of the latter over a definite angle, and an arresting tooth on the oscillatory member adapted to swing clear of the path of the teeth of the escapement wheel but to swing into the path of the last mentioned teeth when the pallet is driven by a tooth of the escapement wheel, a lug on the oscillatory member and a detent member swinging with the pallet adapted to intercept said lug of the oscillatory member to constrain the operative position of the latter to a definite angular degree subsequent to motion of the pallet into driving engagement with the teeth of the escapement wheel.

6. In an escapement device, an escapement wheel having teeth, an oscillatory member having a pallet with one face adapted to swing into the path of a tooth of the escapement wheel, an oscillatory member having a lever adapted to be maintained in constant driving connection with the opposite face of the pallet during operation of the device up to the time the other face of the pallet collides with a tooth of the escapement wheel, and an arresting tooth on the oscillatory member adapted to swing clear of the teeth of the escapement wheel but to swing into the path of the last mentioned teeth when the pallet is driven by a tooth of the escapement wheel; said arresting tooth of the oscillatory member being disposed at a greater distance from the fulcrum of the member as compared to the distance of the pallet faces from the center of oscillation of the pallet.

7. In an escapement device, a toothed escapement wheel, a shaft, a pallet on said shaft, an intermediary lever operatively associated with the pallet and the escapement wheel, a first tooth on the lever adapted to engage the teeth of the escapement wheel successively, and a second tooth on the lever adapted to remain in driving connection with the said pallet whenever a tooth of the escapement wheel is in driving engagement with the first tooth of the intermediary lever; the teeth on said lever being disposed at a distance from the fulcrum of the lever at least twice the distance at which the pallet is disposed from the center of its shaft.

8. In an escapement device, an escapement wheel having teeth, an oscillatory disk, a pallet on the disk, an intermediary lever operatively associated with the escapement wheel and the pallet, said intermediary lever having a first tooth adapted to engage the teeth of the escapement wheel successively, a second tooth on the lever adapted to drive the pallet when the first tooth of the lever is driven by a tooth of the escapement wheel; said pallet having an impulse face adapted to engage the teeth of the escapement wheel periodically while the impulse face of the pallet travels over a limited angle relatively close to or across the line of center to enable contact action between the teeth of the escapement wheel and the said face of the pallet to be effected with a minimum of sliding friction, and a motion-inhibiting instrumentality associated with the interacting movable parts of the escapement device for stopping the pallet in an operative position at the end of a limited angle in either a clockwise or a counter-clockwise direction.

9. In an escapement device, an escapement wheel having driving teeth, a balanced lever having a first tooth adapted to engage the teeth of the escapement wheel successively, a balance wheel, and a shaft therefor, a pallet fast on the balance wheel, a second tooth on the lever adapted to drive the pallet in one given direction, said pallet having an impulse face adapted to engage a tooth of the escapement wheel about the time when the lever ceases to deliver driving power to the pallet, and a stop-member on the lever adapted to strike the shaft of the balance wheel to arrest the motion of the lever about the time when a tooth of the escapement wheel is free to collide with the impulse face of the pallet.

10. In an escapement device, a toothed escape-wheel, an oscillatory pallet having a first and second impulse-face, a balance wheel adapted to swing with the pallet, a balanced lever having a first tooth adapted to engage the first impulse face of the pallet for urging the latter into driving engagement with a tooth of the escapement wheel at the time when driving power is delivered to the lever, a second tooth on the lever adapted to be urged into driving engagement with a tooth of the escapement wheel at the time the latter is driving the pallet, a detent member swinging with the pallet, and means on the lever co-operable with said detent member at a time when the former and the latter are in a definite angular position in relationship with respect to each other to prevent the second tooth of the lever from moving into the path of the teeth of the escapement wheel at the moment the second impulse face of the pallet effects recoil motion in the escapement wheel upon collision with a tooth thereof; the pivotal disposition of the operative parts of the escapement device being to enable the pallet to be impelled on its impulse-faces over a relatively large portion of an arc as compared to the portion of the arc over which the teeth of the lever are impelled.

11. In an escapement device, a toothed escapement wheel, a balanced lever having a first tooth adapted to engage the teeth of the escapement wheel successively, a balance wheel, a pallet fast on the balance wheel, a second tooth on the lever adapted to engage the pallet during the entire period that the first tooth of the lever is in driving engagement with a tooth of the escapement wheel while the latter is under the influence of driving power, said pallet having an impulse face adapted to engage a tooth of the escapement wheel whenever the first tooth of the lever is out of driving engagement with a tooth of the escapement wheel, and a stop-member on the lever adapted to intercept the pallet in a definite angular position to check the motion of the lever and the pallet while the first tooth of the lever is still in driving engagement with a tooth of the escapement wheel.

12. In an escapement, a toothed escapement wheel, an oscillatory lever having a first tooth adapted to swing in and out of driving engagement with the teeth of the escapement wheel, an oscillatory member including a pallet having an impulse face adapted to swing in and out of driving engagement with the escapement wheel, a second tooth on the lever engaging another impulse face on the pallet for interlinkage of power-transmission from the pallet to the lever or vice versa, depending on their direction of angular motion while the teeth of the escapement wheel alternately come into direct driving engagement with the first tooth of the lever and with the first mentioned impulse face of the pallet, and a pendulum having means for the reception of impulses derived from the escapement wheel through the pallet and the lever; both teeth of the lever being disposed at a much greater distance from the fulcrum of the lever as compared to the distance of the pallet from its axis of oscillation, affording the pallet to swing over a relatively large angular degree and the lever to swing over a relatively small angular degree as compared to the swing of the pallet.

13. In an escapement device, an escapement wheel having teeth with driving faces, an oscillatory lever having a first impulse member adapted to engage intermittently the face of a tooth of the escapement wheel, a second impulse member on the lever, an oscillatory member including a pallet having one side adapted to engage the second impulse member of the lever to enable motion to be transmitted from the pallet to the lever and vice versa; said pallet having another side adapted to engage the driving face of a tooth of the escapement wheel whenever another tooth of the escapement wheel terminates its driving engagement with the lever; the pallet also having an additional face adapted to collide with a peripheral portion of the escapement wheel to check the motion of the pallet in a definite angular position to prevent the pallet from becoming disengaged from the tooth of the escapement wheel during the time the pallet effects recoil motion in the wheel while in direct engagement therewith.

14. In an escapement device, a toothed escape-wheel, a first oscillatory member having a tooth to engage the teeth of the escape-wheel successively; a second oscillatory member adapted to engage the teeth of the escape-wheel successively; a driving tooth on the first oscillatory member engaging the second oscillatory member for establishing a constantly operative driving connection between said two oscillatory members to enable the escape-wheel to deliver impulsion to both, the first and second oscillatory member, whenever one of them is in direct driving engagement with a tooth of the escape-wheel, a striking arm connected to one of said oscillatory members, and a sound producing device disposed in the path of the striking arm to be struck thereby during oscillation of the first and second oscillatory member.

15. In an escapement, a toothed escape-wheel, an oscillatory member having two oppositely lying pallet faces, the two pallet faces being approximately equidistantly located from the center of oscillation of said oscillatory member, one of the pallet faces being adapted to come into driving engagement intermittently with the teeth of the escape-wheel; and an oscillatory lever having a first and second tooth, both teeth of the lever being disposed at a considerably greater distance from the fulcrum of said lever as compared to the distance at which the pallet faces are located from the center of oscillation of said oscillatory member; the first tooth of the oscillatory lever engaging the teeth of the escape-wheel periodically, and the second tooth of the lever engaging the other pallet face of the member whereby time-coextensive reciprocal motion in the member and the lever is effected with cooperation of the driving escape-wheel.

16. In an escapement, a toothed escape-wheel, an oscillatory member having a pallet comprising two oppositely lying impulse faces, and a lever having a first and second tooth, the two last named teeth being disposed at a much greater distance from the fulcrum of the lever than the impulse faces of the pallet from the center of oscillation of the oscillatory member adapted to effect angular motion of the pallet larger in degree than the degree of angular motion of the said lever; the first tooth of said lever being adapted to engage one impulse face of said pallet and the second tooth of the lever to engage successively a tooth of the escape-wheel for carrying the said pallet into engagement with the on-coming tooth of the escape-wheel, and means to prevent the pallet from becoming disengaged from the tooth of the escape-wheel when the pallet swings in contrary direction to the direction of impulsion of the escape-wheel.

17. In a device of the character described, the combination of a toothed wheel, an oscillatory member having a pallet adapted to intermittently swing into driving engagement with the teeth of the wheel, an oscillatory lever adapted to swing intermittently into driving engagement with the teeth of the wheel, and an instrumentality embodied with the device for establishing driving connection between the lever and the pallet to cause first one and then the other to move successively into driving engagement with the escapement wheel and to cause reciprocal angular motion in the lever and the pallet to be effected time-coextensively and unidirectionally.

18. In an escapement mechanism, the combination of an escape-wheel, a weighted oscillatory member embodying a pallet having a first and second impulse face disposed in different angular positions in relationship with respect to each other within a region comparatively close to the axis of oscillation of the weighted member; and a vibratory lever having a first and second tooth disposed at spaced relation with respect to each other within a region comparatively far from the fulcrum of the lever as compared to the specified regional disposition of the impulse faces of the pallet; said first impulse face of the pallet and the first tooth of the lever being adapted to engage one another for maintenance of a link of power transmission between the pallet and the lever while swinging time-coextensively over a definite angle of limited extent, and the second impulse face of the pallet severally with the second tooth of the lever being adapted to move each in turn successively in and out of driving engagement with the escape-wheel during time-coextensive reciprocal motion of the weighted oscillatory member and the vibratory lever.

19. A speed-regulating device, comprising an oscillatory pallet having a first impulse face disposed in a definite angular position and a second impulse face arranged at spaced relation therewith in a different angular position, a weighted oscillatory body joined for action with the pallet; an escapement wheel having driving members adapted to successively impel the pallet while engaging it on its second impulse face, a vibratory lever having a first tooth adapted to engage the first impulse face of the pallet for transmission of driving power time-coextensively from the lever to the pallet and vice versa, a second tooth on the lever adapted to swing into driving engagement with a driving member of the escapement wheel for delivering impulsion to the first impulse face of the pallet in a reverse direction at or about the time the second impulse face of the pallet is released from driving engagement with the escapement wheel; said first and second tooth on the vibratory lever being disposed from the fulcrum of the latter at a distance considerably greater as compared to the distance at which the first and second impulse face of the pallet is disposed from the axis of swing of the pallet, to enable the angular motion of the weighted oscillatory body to perform its motion with maximum freedom from interference with frictional resistance imposed by the vibratory lever during its interaction.

20. In an escapement device, an escapement wheel having teeth with curviform driving faces corresponding to involute forms capable of effecting rolling contact action, an oscillatory lever having a tooth with an impulse face adapted to be impelled periodically by a driving face of a tooth of the escapement wheel, an oscillatory member having a pallet adapted to be impelled periodically on one side by a driving face of a tooth of the escapement wheel when the tooth of the lever is free, and a driving member on the lever adapted to engage the other side of the pallet for inter-linkage of power transmission between the pallet and the lever to enable motion to be transmitted from one to the other reciprocally during operation of the device.

21. In an escapement device, a toothed escape-wheel, a first oscillatory member having a tooth adapted to engage the teeth of the escape-wheel successively; a second oscillatory member adapted to engage the teeth of the escape-wheel successively; a driving tooth on the first oscillatory member engaging the second oscillatory member for establishing an operative driving connection between said two oscillatory members when they are disposed in certain definite angular relation with respect to each other to enable the escape-wheel to deliver impulsion to both, the first and second oscillatory member, whenever one of them is in direct driving engagement with a tooth of the escape-wheel, and a spring device operatively connected with the escapement device for repelling the first and second oscillatory member at the end of their excursion.

22. An escapement device, comprising an oscillatory body adapted to swing within an angle of comparatively large degree, an oscillatory lever adapted to swing within an angle of comparatively small degree as compared to the angle of swing of said body, a revoluble plate having operating members adapted for interaction with the said body and lever, and an instrumentality whereby the stated disproportionate angular motion may be effected in association with a definite disposition of the respective fulcrums of the several interacting parts of the escapement device relative one to another; said instrumentality including a first and second driving element on the lever, and a first and second impulse member on the oscillatory body; the second driving element and the second impulse member being adapted to alternately swing into and out of driving engagement with the operating members of the revoluble plate, and the first driving element of the lever being adapted to engage the first impulse member of the oscillatory body for establishment of a driving couple for transmission of motion-imparting impulse power during substantially the entire period when the revoluble plate with one of its operating members is in actual driving engagement with either the second driving element of the lever or the second impulse member of the oscillatory body.

CARL LURTZ.